(12) United States Patent
Kim (10) Patent No.: US 8,895,167 B2
(45) Date of Patent: Nov. 25, 2014

(54) SECONDARY BATTERY HAVING CASING FOR PREVENTING VOLUMETRIC EXPANSION

(75) Inventor: Gil-Ho Kim, Cheonan-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 2292 days.

(21) Appl. No.: 11/191,240

(22) Filed: Jul. 28, 2005

(65) Prior Publication Data
US 2006/0051666 A1 Mar. 9, 2006

(30) Foreign Application Priority Data
Jul. 29, 2004 (KR) .................. 10-2004-0059956

(51) Int. Cl.
| | |
|---|---|
| *H01M 2/02* | (2006.01) |
| *H01M 10/04* | (2006.01) |
| *H01M 2/36* | (2006.01) |
| *H01M 10/0525* | (2010.01) |
| *H01M 10/34* | (2006.01) |
| *H01M 2/04* | (2006.01) |

(52) U.S. Cl.
CPC ...... *H01M 10/0431* (2013.01); *H01M 10/0413* (2013.01); *H01M 2/0207* (2013.01); *H01M 2/0275* (2013.01); *H01M 2/04* (2013.01); *H01M 2/361* (2013.01); *H01M 2/365* (2013.01); *H01M 10/0436* (2013.01); *H01M 10/0525* (2013.01); *H01M 10/34* (2013.01); *Y02E 60/122* (2013.01)
USPC ................. 429/66; 429/94; 429/176

(58) Field of Classification Search
CPC ............................ H01M 2/02; H01M 10/0413
USPC ............................................... 429/66, 94, 176
See application file for complete search history.

(56) References Cited

U.S. PATENT DOCUMENTS
5,492,779 A * 2/1996 Ronning .................. 429/120
6,630,270 B1 * 10/2003 Kim et al. ................ 429/94

FOREIGN PATENT DOCUMENTS
| JP | 07-183010 A | 7/1995 |
|---|---|---|
| JP | 09-199087 A | 7/1997 |
| JP | 1292155 A | 4/2001 |
| JP | 2002-245975 A | 8/2002 |
| KR | 10-2000-0042088 | 7/2000 |
| WO | 00/039067 A | 7/2000 |

OTHER PUBLICATIONS

JP2002-245975 machine translation (Aug. 30, 2002).*
JP09-199087 machine translation (Jul. 31, 1997).*

* cited by examiner

*Primary Examiner* — Tracy Dove
(74) *Attorney, Agent, or Firm* — Robert E. Bushnell, Esq.

(57) ABSTRACT

Disclosed is a secondary battery having a element for compensating for and preventing volumetric expansion during charging/discharging of the battery, in order to prevent the electrode assembly from deforming due to rising internal pressure and compensate for and prevent the expansion of the secondary battery case. The secondary battery includes an electrode assembly having positive and negative electrode plates having active materials formed on at least one surface of positive and negative electrode collectors and a separator interposed between the positive and negative electrode plates, a case having a space for containing the electrode assembly and at least one element for compensating for and preventing volumetric expansion, and a cap assembly adapted to be coupled to the case and seal it and provided with a terminal portion in electrical connection to the electrode assembly.

18 Claims, 6 Drawing Sheets

SECONDARY BATTERY HAVING CASING FOR PREVENTING VOLUMETRIC EXPANSION

BACKGROUND OF THE INVENTION

1. Field of the Invention

The present invention relates to a secondary battery, and more particularly to a secondary battery having at least one element for compensating for and preventing volumetric expansion during charging/discharging of the battery, in order to prevent the electrode assembly from deforming due to rising internal pressure and to compensate for and prevent the expansion of the secondary battery case.

2. Description of the Related Art

Recently, compact and light electric/electronic appliances including cellular telephones, laptop computers, and camcorders are actively developed and produced. Such portable electric/electronic appliances house a battery pack for operation in a place where additional power supply is unavailable. The battery pack has at least one battery therein to output a predetermined level of voltage for operating the portable electric/electronic appliances for a period of time.

The battery pack currently adopts a secondary battery, which can be charged and discharged, in consideration of economic aspects. Typical secondary batteries include nickel-cadmium (Ni—Cd) batteries, nickel-hydrogen (Ni-MH) batteries, and lithium secondary batteries such as lithium (Li) batteries and lithium ion batteries.

Particularly, lithium ion secondary batteries have an operating voltage of 3.6V, which is three times larger than that of nickel-cadmium batteries or nickel-hydrogen batteries which are used in can cases as the power supply for portable electronic appliances. The lithium ion secondary batteries also have a large energy density per unit weight. As such, they are widely used in the industry.

Lithium ion secondary batteries usually use lithium-based oxide as positive electrode active materials and carbon material as negative electrode active materials. Lithium ion secondary batteries are generally classified into liquid electrolyte batteries and polymer electrolyte batteries according to the type of electrolyte. Batteries using a liquid electrolyte are referred to as lithium ion batteries, and batteries using a polymer electrolyte are referred to as lithium polymer batteries. Lithium ion secondary batteries are manufactured in various shapes, including cylinder, rectangular, and pouch shapes.

Lithium ion secondary batteries generally include an electrode assembly formed by winding a positive electrode plate coated with positive electrode active materials, a negative electrode plate coated with negative electrode active materials, and a separator positioned between the positive and negative electrode plates to prevent a short circuit and allow the movement of lithium ions only; a lithium ion secondary battery case for containing the electrode assembly; and an electrolyte injected into the lithium ion secondary battery case to allow the movement of lithium ions.

A method of manufacturing a lithium ion secondary battery is described as follows.

A positive electrode plate is coated with positive electrode active materials and is connected to a positive electrode tab. A negative electrode plate is coated with negative electrode active materials and is connected to a negative electrode tab. The positive and negative electrode plates are laminated together with a separator, all of which are wound to complete an electrode assembly. The main component of the positive electrode active materials is a complex oxide including lithium (Li). Lithium carbonate and cobalt oxide are mixed in a radio of 1.2:1 and baked at 400° C. to 1000° C. to form $LiCoO_2$, which is generally used as the positive electrode active materials.

Thereafter, the electrode assembly is contained in the lithium ion battery case in such a manner that it does not escape from the case. An electrolyte is injected into the lithium ion secondary battery case, which is then sealed to complete a lithium ion secondary battery.

However, lithium ion secondary batteries have a problem in that, when they are repeatedly charged and used, gas can be generated and the internal pressure of the battery can rise accordingly. The case of the lithium ion secondary battery then expands (i.e., a swelling phenomenon) and the electrode assembly deforms.

The swelling phenomenon and the deformation of the electrode assembly are caused as follows: when the voltage of the lithium ion secondary battery rises above a reference value due to overcharging, lithium carbonate remaining in the positive electrode active materials ($LiCoO_2$) decomposes and generates carbonate gas. The electrode assembly then expands and the internal pressure of the case of lithium ion secondary battery rises.

If the electrode assembly deforms heavily, a short circuit can occur between the negative and positive electrode plates of the electrode assembly.

Meanwhile, if the internal pressure rises excessively when the lithium ion secondary battery is used, the battery can explode.

In order to solve these problems, a safety device referred to as a "safety vent" has been introduced in Korean Registered Patent No. 10-0329562.

The safety vent is generally a part of the cap plate or case of a rectangular-type lithium ion secondary battery, which is substantially thinner that the substrate (for example, 40% or less of the thickness of the substrate), and is adapted to fracture, if the internal pressure of the battery rises, and prevent danger such as explosion.

However, the safety vent has a problem in that it can be easily broken by an external impact (e.g., a drop) because it is substantially thinner than the substrate.

Furthermore, if the internal pressure of the lithium ion secondary battery rises and the safety vent fractures accordingly, the internal sealing of the battery is released. The battery then cannot be used any longer.

While lithium ion secondary batteries have been discussed above, the present invention is not limited to lithium ion batteries.

SUMMARY OF THE INVENTION

Accordingly, the present invention has been made to solve the above-mentioned problems, and an object of the present invention is to provide a secondary battery having at least one element for compensating for and preventing volumetric expansion during charging/discharging of the battery, in order to prevent the electrode assembly from deforming due to rising internal pressure and to compensate for and prevent the expansion of the secondary battery case.

In order to accomplish this object, a secondary battery is provided comprising: an electrode assembly having positive and negative electrode plates and including active materials arranged on at least one surface of positive and negative electrode collectors and further including a separator interposed between the positive and negative electrode plates; a case having a space adapted to contain the electrode assembly and having at least one element adapted to compensate for and to prevent volumetric expansion of the case; and a cap assembly adapted to be attached to the case and to seal it, the cap portion including a terminal portion adapted to be electrically connected to the electrode assembly.

The case preferably has a box shape with an open top and has a lateral portion and a bottom portion, the lateral portion comprises four lateral surfaces of two long-sided portions and two short-sided portions, and the at least one element for compensating for and preventing volumetric expansion is positioned on at least one lateral surface of the lateral portion of the case.

The at least one element for compensating for and preventing volumetric expansion is preferably recessed toward the space adapted to contain the electrode assembly.

The depth of recession of the at least one element for compensating for and preventing volumetric expansion preferably corresponds to 5% to 15% of the distance between the lateral surface on which the at least one element for compensating for and preventing volumetric expansion is positioned and a facing lateral surface.

The at least one element for compensating for and preventing volumetric expansion preferably protrudes towards an exterior of the case.

The height of protrusion of the at least one element for compensating for and preventing volumetric expansion preferably corresponds to 5% to 15% of the distance between the lateral surface on which the at least one element for compensating for and preventing volumetric expansion is positioned and a facing lateral surface.

The at least one element for compensating for and preventing volumetric expansion is preferably positioned on two facing lateral surfaces of the four lateral surfaces of the lateral portion of the case.

The at least one element for compensating for and preventing volumetric expansion is preferably positioned on the two long-sided portions of the four lateral surfaces of the lateral portion of the case.

The at least one element for compensating for and preventing volumetric expansion is preferably positioned at a center of the lateral surface of the case.

The height of the at least one element for compensating for and preventing volumetric expansion preferably corresponds to 30% to 40% of the height of the lateral surface of the case on which the at least one element for compensating for and preventing volumetric expansion is positioned.

The width of the at least one element for compensating for and preventing volumetric expansion preferably corresponds to 30% to 40% of the width of the lateral surface of the case on which the at least one element for compensating for and preventing volumetric expansion is positioned.

The area of the at least one element for compensating for and preventing volumetric expansion preferably corresponds to 9% to 16% of the area of the lateral surface of the case on which the at least one element for compensating for and preventing volumetric expansion is positioned.

In order to further accomplish this object, a secondary battery case is provided comprising: a lateral portion defining a space adapted to contain an electrode assembly and having at least one element adapted to compensate for and to prevent volumetric expansion; and a bottom portion adapted to seal a lower space of the lateral portion.

The lateral portion preferably comprises four lateral surfaces including two long-sided portions and two short-sided portions, at least one of the four lateral surfaces of the lateral portion including the at least one element adapted to compensate for and to prevent volumetric expansion positioned thereon.

The at least one element adapted to compensate for and to prevent volumetric expansion is preferably recessed toward the space adapted to contain the electrode assembly.

The depth of recession of the at least one element adapted to compensate for and to prevent volumetric expansion preferably corresponds to 5% to 15% of a distance between the lateral surface on which the at least one element adapted to compensate for and to prevent volumetric expansion is positioned and a facing lateral surface.

The at least one element adapted to compensate for and to prevent volumetric expansion preferably protrudes towards an exterior of the case.

A height of protrusion of the at least one element adapted to compensate for and to prevent volumetric expansion preferably corresponds to 5% to 15% of a distance between the lateral surface on which the at least one element adapted to compensate for and to prevent volumetric expansion is positioned and a facing lateral surface.

The at least one element adapted to compensate for and to prevent volumetric expansion is preferably positioned on two facing lateral surfaces of the four lateral surfaces of the lateral portion of the case.

The at least one element adapted to compensate for and to prevent volumetric expansion is preferably positioned on two long-sided portions of the four lateral surfaces of the lateral portion of the case.

The at least one element adapted to compensate for and to prevent volumetric expansion is preferably positioned at a center of the lateral surface having the at least one element adapted to compensate for and to prevent volumetric expansion positioned thereon.

In order to also accomplish this object, a secondary battery is provided comprising: an electrode assembly having positive and negative electrode plates and including active materials arranged on at least one surface of positive and negative electrode collectors and further including a separator interposed between the positive and negative electrode plates; and a box shaped case having an open top and having a lateral portion defining a space adapted to contain the electrode assembly and a bottom portion adapted to seal a lower space of the lateral portion, the box shaped case being adapted to be attached to a top of a cap assembly and having at least one square element adapted to compensate for and to prevent volumetric expansion positioned on a part of at least one of the four lateral surfaces of the lateral portion; wherein the cap assembly is adapted to be attached to the box shaped case to seal it; and wherein the cap assembly includes a terminal portion adapted to be electrically connected to the electrode assembly.

The at least one square element adapted to compensate for and to prevent volumetric expansion is preferably positioned on two facing long-sided portions of the four lateral surfaces of the lateral portion.

The at least one square element adapted to compensate for and to prevent volumetric expansion preferably has four rounded corners.

The secondary battery preferably further comprises one of either a groove or protrusion connected to the at least one square element adapted to compensate for and to prevent volumetric expansion along both diagonal directions thereof.

In order to still further accomplish this object, a secondary battery is provided comprising: an electrode assembly having positive and negative electrode plates and including active materials arranged on at least one surface of positive and negative electrode collectors and further including a separator interposed between the positive and negative electrode plates; and a box shaped case having an open top and having a lateral portion defining a space adapted to contain the electrode assembly and a bottom portion adapted to seal the lower space of the lateral portion, the case being adapted to be attached to a top of a cap assembly and having first and second elements adapted to compensate for and to prevent volumetric expansion positioned on a part of at least one of the four lateral surfaces of the lateral portion; wherein the cap assembly is adapted to be attached to the case and to seal it; and wherein the cap assembly includes a terminal portion adapted to be electrically connected to the electrode assembly.

The first and second elements adapted to compensate for and to prevent volumetric expansion are preferably one of either recessed toward a space adapted to contain the electrode assembly or protruding towards an exterior of the case.

The first element adapted to preferably compensate for and to prevent volumetric expansion has a square shape and the second element adapted to compensate for and to prevent volumetric expansion extends along both diagonal directions of the first element adapted to compensate for and to prevent volumetric expansion.

In order to yet further accomplish this object, a secondary battery is provided comprising: an electrode assembly having positive and negative electrode plates including active materials arranged on at least one surface of positive and negative electrode collectors and further including a separator interposed between the positive and negative electrode plates; and a case having a lateral portion including four lateral surfaces in the shape of a box having an open top and bottom and a bottom portion adapted to seal a lower space of the lateral portion, the case being adapted to be attached to a top of a cap assembly and having at least one element adapted to compensate for and to prevent volumetric expansion, the at least one element adapted to compensate for and to prevent volumetric expansion including first and second direction components positioned on a part of at least one of the four lateral surfaces of the lateral portion; wherein the cap assembly is adapted to be attached to the case and to seal it; and wherein the cap assembly includes a terminal portion adapted to be electrically connected to the electrode assembly.

The first direction component is preferably one of either a horizontal or vertical component and wherein the second direction component extends from an end of the first direction component at a predetermined angle relative to the first direction component.

The predetermined angle between the first and second direction components is preferably greater than 0° and less than 90°.

At least one of the four lateral surfaces of the lateral portion preferably includes two elements adapted to compensate for and to prevent volumetric expansion, the first direction components of the two elements adapted to compensate for and to prevent volumetric expansion are parallel to each other, and the second direction components of the two elements adapted to compensate for and to prevent volumetric expansion are positioned opposite to the other element adapted to compensate for and to prevent volumetric expansion.

At least one of the four lateral surfaces of the lateral portion preferably includes two elements adapted to compensate for and to prevent volumetric expansion, the first direction components of the two elements adapted to compensate for and to prevent volumetric expansion are parallel to each other, and the second direction components of the two elements adapted to compensate for and to prevent volumetric expansion are positioned in the same direction as the other element adapted to compensate for and to prevent volumetric expansion.

In order to also accomplish this object, a method of manufacturing a secondary battery is provided, the method comprising: forming an element adapted to compensate for and to prevent volumetric expansion on a part of a lateral portion of a plate member of a secondary battery case, which is divided into a lateral portion and a bottom portion, and forming a secondary battery case by plastic working of the plate member of a secondary battery case.

Forming an element adapted to compensate for and to prevent volumetric expansion preferably comprises forging.

Forming a secondary battery case preferably comprises drawing.

The element adapted to compensate for and to prevent volumetric expansion is preferably either recessed towards a space adapted to contain an electrode assembly or protrudes towards an exterior of the case.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, an exemplary embodiment of the present invention is described with reference to the accompanying drawings. In the following description and drawings, the same reference numerals are used to designate the same or similar components, and accordingly, a repetition of the description of the same or similar components has been omitted.

Figure 1:
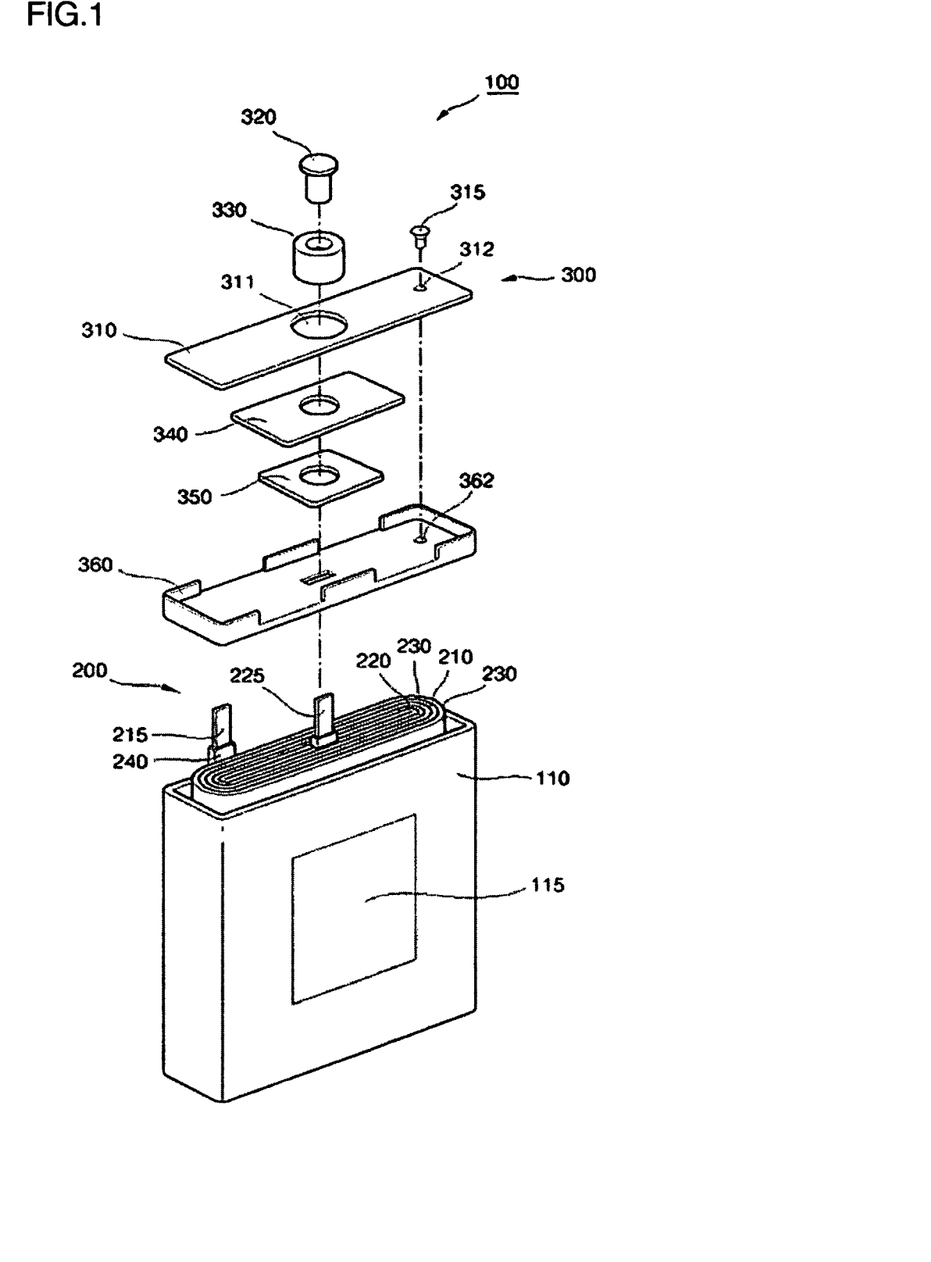
FIG. 1 is an exploded perspective view of a square secondary battery according to an embodiment of the present invention.

FIG. 1 is an exploded perspective view of a rectangular secondary battery according to an embodiment of the present invention.

Referring to FIG. 1, a secondary battery 100 according to an embodiment of the present invention includes a secondary battery case 110, a jelly-roll electrode assembly 200 contained in the secondary battery case 110, and a cap assembly 300 attached to the top of the secondary battery case 110.

The secondary battery case 110 is an approximately box-shaped metallic can having an open top and can function as an electrical terminal of the battery. The secondary battery case 110 has at least one element 115 positioned on the case 110 for compensating for and preventing volumetric expansion during charging/discharging of the secondary battery.

The electrode assembly 200 is formed by winding a positive electrode plate 210 having a positive electrode tab 215 attached thereto, a negative electrode plate 220 having a negative electrode tab 225 attached thereto, and a separator 230 interposed between the positive and negative electrode plates 210 and 220. The positive and negative electrode tabs 215 and 225 are respectively insulated by an insulation tape 240 at the boundary portion where they extend from the electrode assembly 200, in order to avoid a short circuit between the positive and negative electrode plates 210 and 220.

The cap assembly 300 includes a flat plate-shaped cap plate 310 having a size and a shape corresponding to the size and shape of an opening of the secondary battery case 110. The cap plate 310 has a terminal through-hole 311 formed at the center thereof and an electrolyte injection hole 312 formed on a side thereof to inject an electrolyte therethrough. The electrolyte injection hole 312 is sealed by a ball 315.

The terminal through-hole 311 has an electrode terminal 320, e.g., a negative electrode, positioned therein in such a manner that it can be inserted therein. The electrode terminal 320 has a tube-shaped gasket 330 positioned on the outer surface thereof for electrical insulation from the cap plate 310. The cap plate 310 has an insulation plate 340 positioned on the lower surface thereof. The insulation plate 340 has a terminal plate 350 positioned on the lower surface thereof.

The electrode terminal 320 is inserted through the terminal through-hole 311 while the gasket 330 surrounds the outer peripheral surface thereof. The bottom surface of the electrode terminal 320 is electrically connected to the terminal plate 350 with the insulation plate 340 interposed between them.

The positive electrode tab 215 extending from the positive electrode plate 210 is welded to the lower surface of the cap plate 310. The negative electrode tab 225 extending from the negative electrode plate 220 is welded to the bottom of the electrode terminal 320.

The electrode assembly 200 has an insulation case 360 positioned on the top surface thereof to electrically insulate it from the cap assembly 300 and to cover the top thereof. The insulation case 360 has an electrolyte injection through-hole 362 formed at a position corresponding to that of the electrolyte injection hole 312 of the cap plate 310 so that an electrolyte can be injected therethrough. The insulation case 360 is of an insulating polymer resin, preferably polypropylene. However, the present invention is not limited thereto.

Figure 2A:
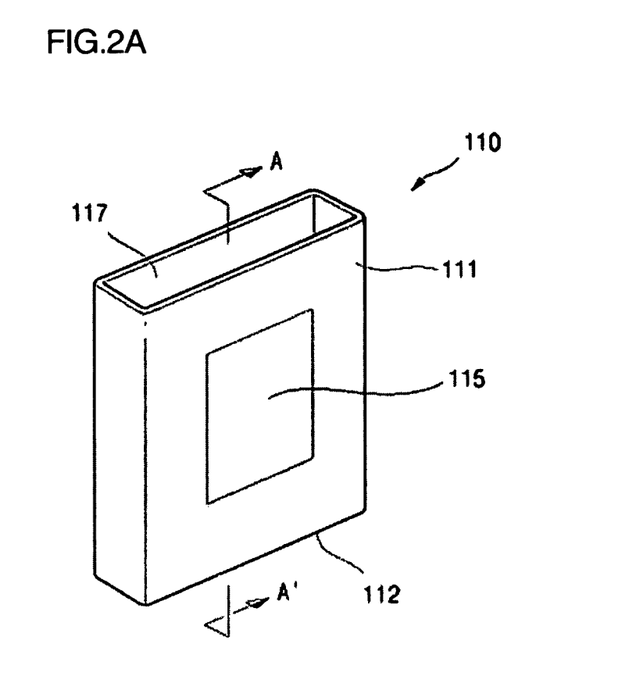
FIG. 2A is a perspective view of a secondary battery case having at least one element for compensating for and preventing volumetric expansion of a secondary battery according to an embodiment of the present invention.
Figure 2B:
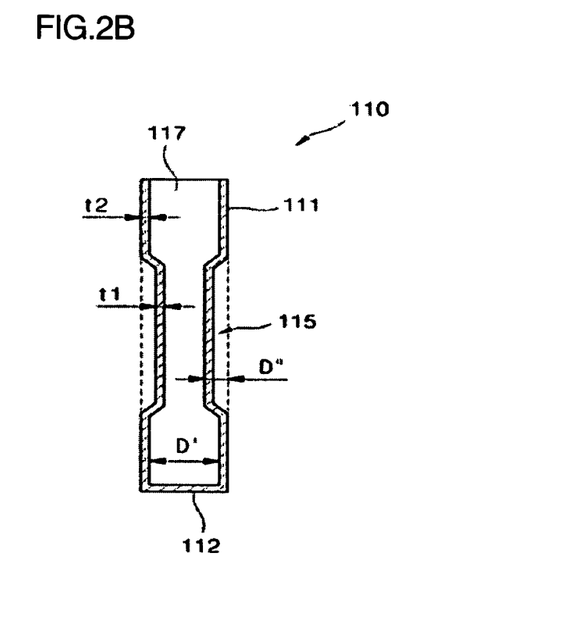
FIGS. 2B and 2C are longitudinal sectional views of a secondary battery case taken along line A-A' of FIG. 2A.
Figure 2C:
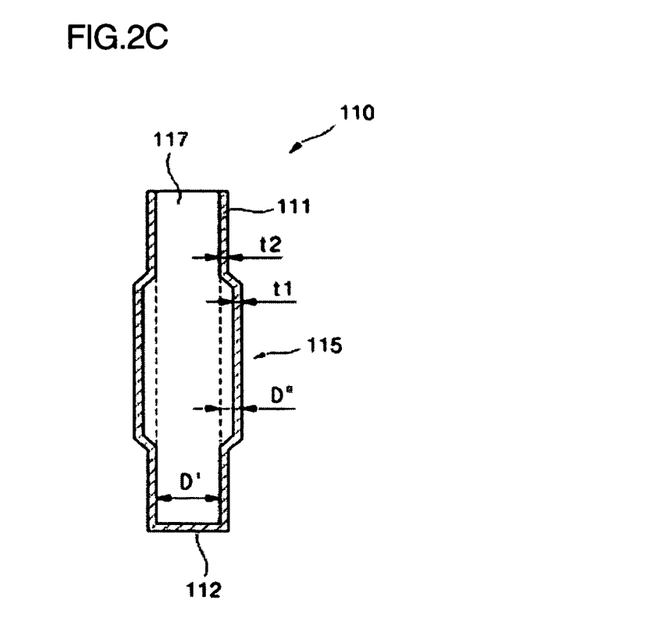
Figure 2D:
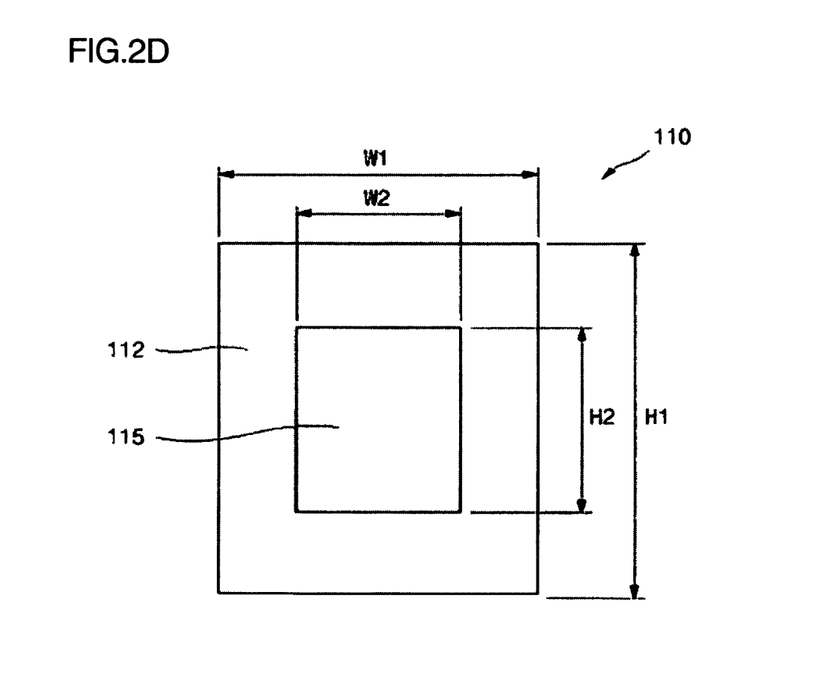
FIG. 2D is a front view of a secondary battery case having at least one element for compensating for and preventing volumetric expansion of a secondary battery according to an embodiment of the present invention.

FIG. 2A is a perspective view of a secondary battery case having at least one element for compensating for and preventing volumetric expansion of a secondary battery according to an embodiment of the present invention, FIG. 2B is a front view of a secondary battery case having at least one element for compensating for and preventing volumetric expansion of a secondary battery according to an embodiment of the present invention, FIG. 2C is a longitudinal sectional view of a secondary battery case taken along line A-A' of FIG. 2A, and FIG. 2D is a front view of a secondary battery case having at least one element for compensating for and preventing volumetric expansion of a secondary battery according to an embodiment of the present invention.

Referring to FIG. 2A, a secondary battery case 110 according to an embodiment of the present invention includes a box-shaped metallic can having an open top and has a space 117 for containing the electrode assembly 200. Specifically, the secondary battery case 110 has a lateral portion 111 defining a predetermined space so that the cylindrical electrode assembly 200 can be attached thereto and a bottom portion 112 positioned beneath the lateral portion 111 to seal the lower space of the lateral portion 111. The lateral portion 111 has an open top so that the electrode assembly 200 can be inserted therethrough.

The lateral portion of the secondary battery case 110 consists of four lateral surfaces including two long-sided portions and two short-sided portions. Although not shown in the drawings, two facing short-sided portions of the four lateral surfaces of the lateral portion 111 of the secondary battery case 110 can have a rounded curved surface. Particularly, two facing long-sided portions of the four lateral surfaces of the lateral portion 111 of the secondary battery case 110 can be planar and two facing short-sided portions thereof can be rounded curved surfaces.

The secondary battery case 110 can be electrically connected to the positive or negative electrode of the electrode assembly 200 and act as a terminal electrode.

The secondary battery case 110, as mentioned above, has at least one element 115 for compensating for and preventing volumetric expansion, in order to prevent the electrode assembly 200 from deforming due to volumetric expansion caused by rising internal pressure during charging/discharging of the secondary battery 100 and to compensate for the deformation of the secondary battery case 110.

The at least one element 115 for compensating for and preventing volumetric expansion is preferably positioned on at least one of the four lateral surfaces of the lateral portion 111 of the secondary battery case 110. Preferably, the at least one element 115 for compensating for and preventing volumetric expansion is positioned on two facing lateral surfaces of the secondary battery case 110. More preferably, the at least one element 115 for compensating for and preventing volumetric expansion is positioned on two facing long-sided portions of the secondary battery case 110.

The at least one element 115 for compensating for and preventing volumetric expansion is preferably positioned at the center of at least one of the four lateral surfaces of the lateral portion 111 of the secondary battery case 110. This is because the center of any lateral surface of the later portion 111 of the secondary battery case 110 expands and deforms most severely during charging/discharging of the secondary battery 100, and the periphery thereof expands and deforms less severely.

Referring to FIG. 2B, the at least one element 115 for compensating for and preventing volumetric expansion can be recessed toward the space 117 for containing the electrode assembly 200 of the secondary battery case 110.

The at least one element 115 for compensating for and preventing volumetric expansion, recessed as above, reverses its shape and protrudes outward, if the internal pressure of the secondary battery 100 rises above a predetermined value, and compensates for the volumetric expansion of the secondary battery case 110 due to rising internal pressure of the secondary battery 100. If the internal pressure of the secondary battery 100 is below a predetermined value, the at least one element 115 for compensating for and preventing volumetric expansion also plays the role of compressing the electrode assembly 200 and preventing it from floating.

The depth D of recession of the at least one element 115 for compensating for and preventing volumetric expansion toward the space 117 for containing the electrode assembly 200 preferably corresponds to 5% to 15% of the distance D' between the lateral surface on which the at least one element 115 for compensating for and preventing volumetric expansion is positioned and the facing lateral surface.

The thickness t1 of the portion on which the at least one element 115 for compensating for and preventing volumetric expansion is positioned is identical to the thickness t2 of the secondary battery case 110.

Referring to FIG. 2C, the at least one element 115 for compensating for and preventing volumetric expansion can protrude toward the exterior of the secondary battery case 110.

The at least one element 115 for compensating for and preventing volumetric expansion, protruding toward the exterior as above, increases the volume of the internal space of the secondary battery 100 and attenuates the rise of internal pressure, and additionally improves the battery capacity of the secondary battery 100.

The height D" of protrusion of the at least one element 115 for compensating for and preventing volumetric expansion to the exterior preferably corresponds to 5% to 15% of the distance D' between the lateral surface on which the at least one element 115 for compensating for and preventing volumetric expansion is positioned and the facing lateral surface.

The thickness t1 of the portion on which the at least one element 115 for compensating for and preventing volumetric expansion is positioned is identical to the thickness t2 of the secondary battery case 110, the same as shown in FIG. 2B.

Referring to FIG. 2D, the at least one element 115 for compensating for and preventing volumetric expansion is approximately a square. The height H1 of the at least one element 115 for compensating for and preventing volumetric expansion preferably corresponds to 30% to 40% of the height H2 of the lateral surface of the secondary battery case 110 on which the at least one element 115 for compensating for and preventing volumetric expansion is positioned, and the width W1 of the at least one element 115 for compensating for and preventing volumetric expansion preferably corresponds to 30% to 40% of the width W2 of the lateral surface of the secondary battery case 110 on which the at least one element 115 for compensating for and preventing volumetric expansion is positioned.

In other words, the area of the at least one element 115 for compensating for and preventing volumetric expansion preferably corresponds to 9% to 16% of the area of the lateral surface of the secondary battery case 110 on which the at least one element 115 for compensating for and preventing volumetric expansion is positioned.

This is for the purpose of minimizing the decrease in the internal space of the secondary battery case 110 caused by the at least one element 115 for compensating for and preventing volumetric expansion and avoiding any influence on the battery capacity of the secondary battery 100.

FIGS. 3A to 3D are front views of a secondary battery case having at least one element for compensating for and preventing volumetric expansion according to an embodiment of the present invention.

Referring to FIGS. 3A to 3D, the at least one element 115 for compensating for and preventing volumetric expansion can be positioned on one of the lateral surfaces of the secondary battery case 110 with various shapes, including approximately square shape as shown in FIG. 2D.

Figure 3A:
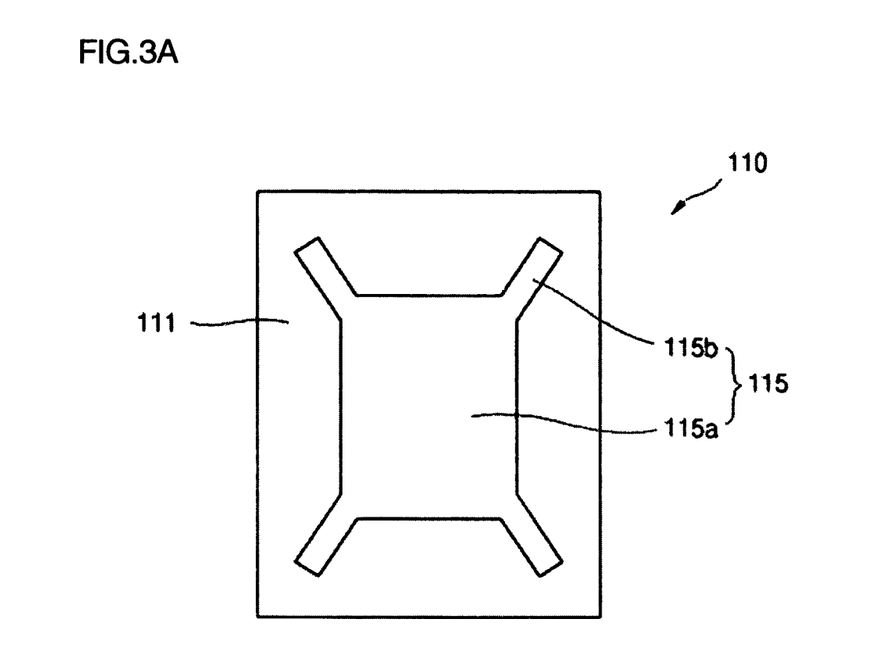
FIGS. 3A to 3D are diagrammatic views of a secondary battery case having at least one element for compensating for and preventing volumetric expansion of a secondary battery according to an embodiment of the present invention.

For example, the at least one element 115 for compensating for and preventing volumetric expansion can be approximately square and have an additional groove or protrusion connected to the square along both diagonal directions thereof.

Specifically, the at least one element 115 for compensating for and preventing volumetric expansion can include a first element 115a for compensating for and preventing volumetric expansion of an approximately square shape and second element 115b for compensating for and preventing volumetric expansion of a shape of a groove or protrusion extending along both diagonal directions of the first element 115a for compensating for and preventing volumetric expansion with a predetermined width.

Figure 3B:
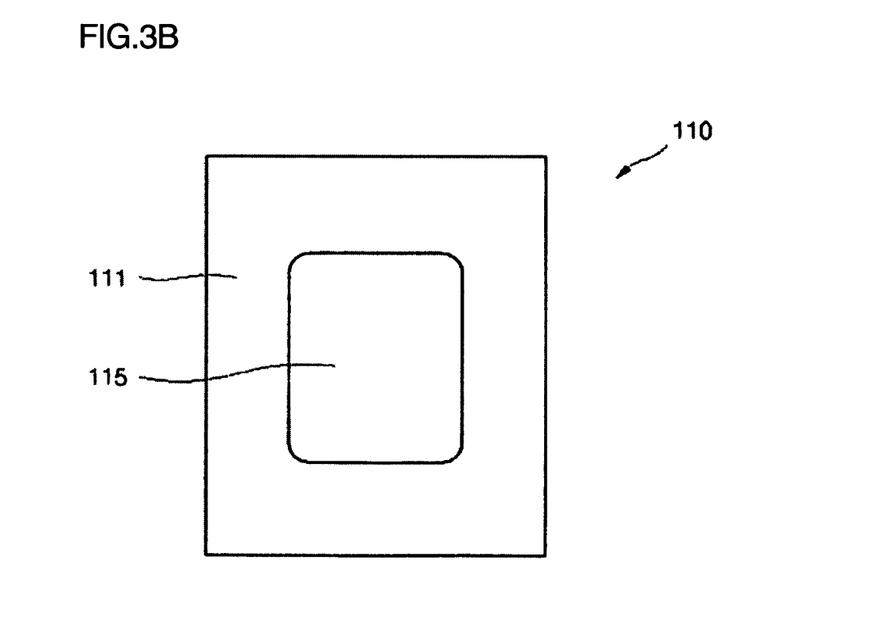

The at least one element 115 for compensating for and preventing volumetric expansion can also has the shape of a square having rounded corners as shown in FIG. 3B.

Figure 3C:
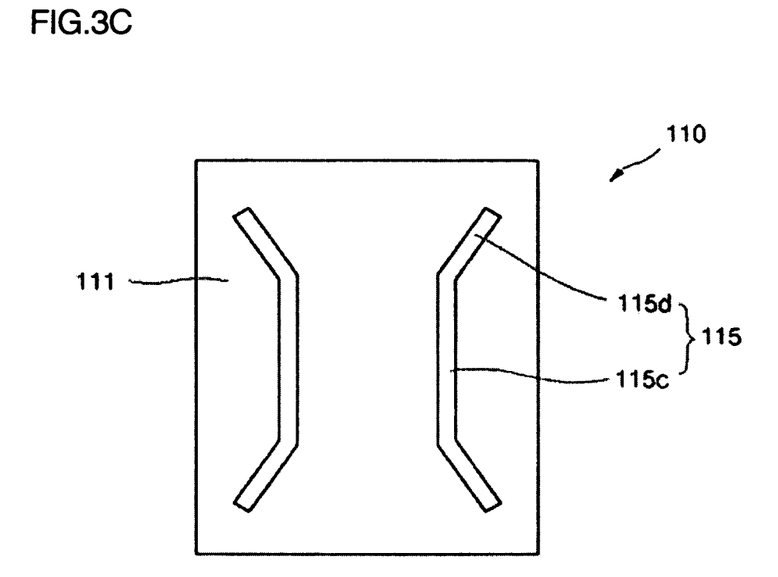
Figure 3D:
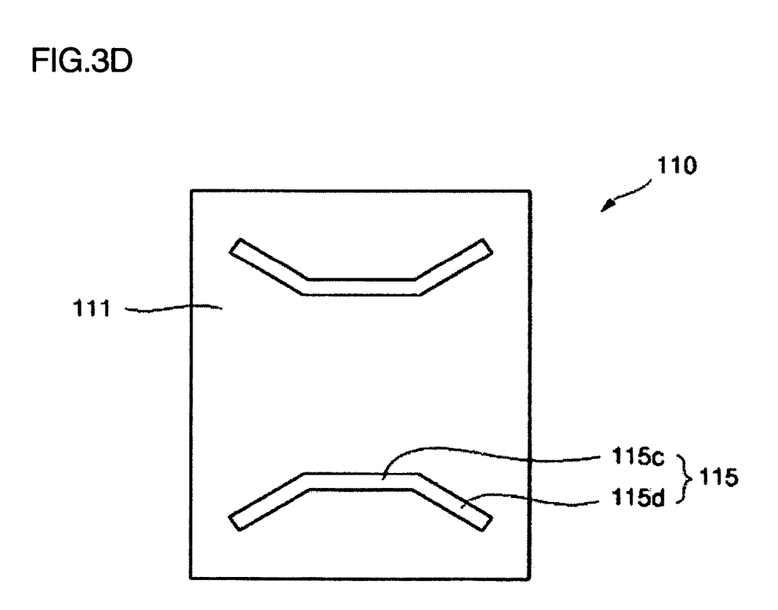

Alternatively, the at least one element 115 for compensating for and preventing volumetric expansion can approximately have the shape of a boomerang as shown in FIGS. 3C and 3D. In particular, the at least one element 115 for compensating for and preventing volumetric expansion can have a first direction component 115c, which is a horizontal or vertical component, and a second direction component 115d extending from an end of the first direction component 115c with a predetermined angle relative to the first direction component 115c. The angle between the first and second direction components 115c and 115d is preferably above 0° and below 90°, and more preferably 30° to 60°.

At least one element 115 for compensating for and preventing volumetric expansion of a boomerang shape as mentioned above can be positioned on at least one lateral surface of the lateral portion 111 of the secondary battery case 110. Preferably, two elements 115 for compensating for and preventing volumetric expansion of a boomerang shape are positioned while facing each other. Specifically, two elements 115 for compensating for and preventing volumetric expansion including first and second direction components 115c and 115d are positioned on at least one lateral surface of the lateral portion 111 of the secondary battery case 110 in such a manner that the first direction components 115c of the two elements 115 for compensating for and preventing volumetric expansion are positioned parallel to each other and the second direction components 115d thereof are positioned in a direction opposite to the other elements 115 for compensating for and preventing volumetric expansion.

Although not shown in the drawings, the second direction components 115d can be positioned in the same direction as the other element 115 for compensating for and preventing volumetric expansion.

Figure 4A:
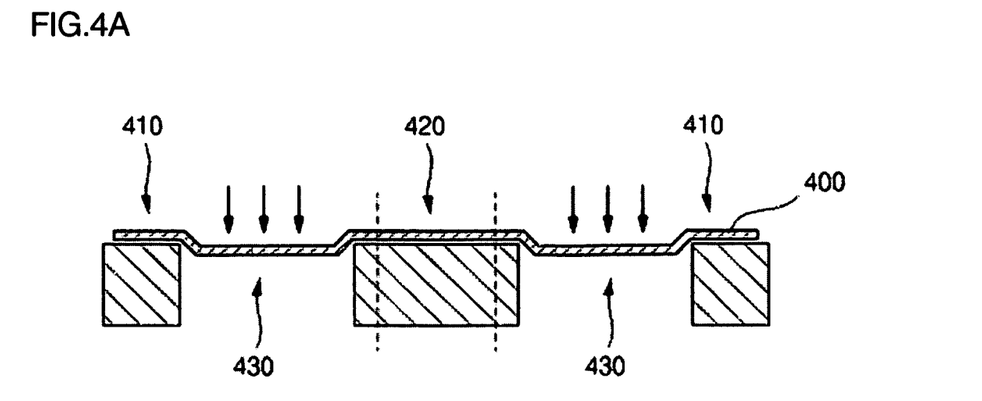
FIGS. 4A and 4B are diagrammatic views of a method of manufacturing a secondary battery case having at least one element for compensating for and preventing volumetric expansion of a secondary battery according to an embodiment of the present invention.
Figure 4B:
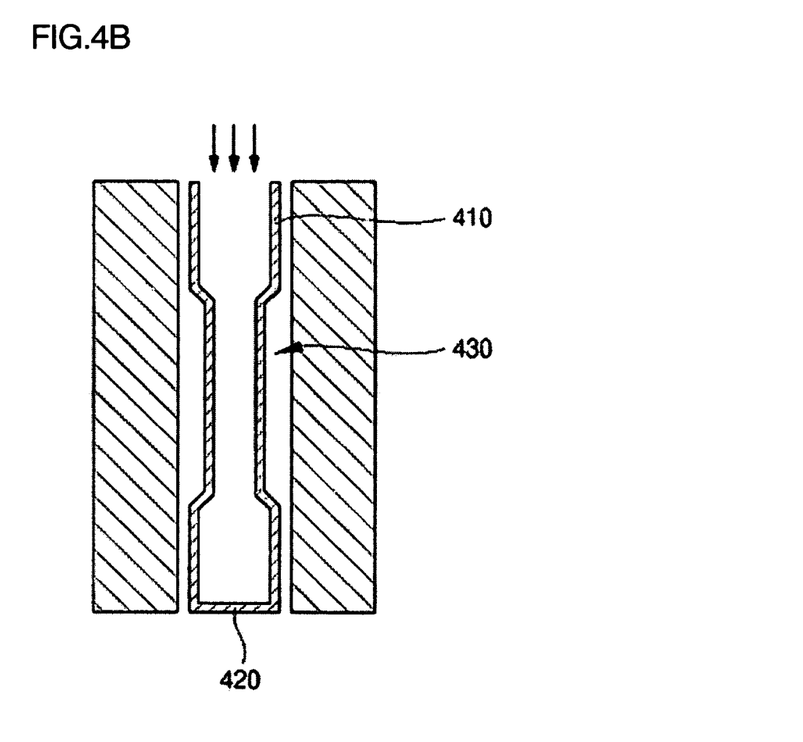

FIGS. 4A to 4B are diagrammatic views of a method of manufacturing a secondary battery case having at least one element for compensating for and preventing volumetric expansion of a secondary battery according to an embodiment of the present invention.

Referring to FIG. 4A, a plate member 400 for a secondary battery case is prepared. The plate member 400 is preferably made up of malleable metallic material which can be subject to plastic working using a press (e.g., drawing or forging), such as aluminum (Al), an aluminum alloy, or an equivalent thereof. However, the present invention is not limited thereto. The plate member 400 is divided into a lateral portion 410 and a bottom portion 420 when processed as a secondary battery case.

A part of the lateral portion 410 of the plate member 400 is subject to plastic working, such as forging, to form a elements 430 for compensating for and preventing volumetric expansion.

Referring to FIG. 4B, after forming the elements 430 for compensating for and preventing volumetric expansion on a part of the lateral portion 410, the bottom portion 420 of the plate member is subject to plastic working under pressure, such as drawing, to form a secondary battery case.

The following Table 1 is given as a result of a deformation experiment of the secondary battery case 110 having elements 115 and 430 for compensating for and preventing volumetric expansion according to the present invention.

In the test, a secondary battery case 110 of aluminum (Al) with a size of 29.5 mm×55.8 mm×5.8 mm is prepared, and elements 115 and 430 for compensating for and preventing volumetric expansion are formed on the secondary battery case 110 with a depth of 1 mm. The internal pressure is 17 kgf/cm².

TABLE 1

| Shape | None | Square or square having rounded corners | | Boomerang | | Square + diagonal extensions | |
| --- | --- | --- | --- | --- | --- | --- | --- |
| | | Recession | Protrusion | Recession | Protrusion | Recession | Protrusion |
| Amount of deformation | 0.5373 mm | 0.4507 mm | 0.4454 mm | 0.4926 mm | 0.4844 mm | 0.3634 mm | 0.3504 mm |
| Remark | 100% | 84% | 83% | 91% | 90% | 67% | 65% |

Referring to Table 1, it is clear that a secondary battery case 110 with elements for compensating for and preventing volumetric expansion 115 and 430 in the shape of a square having rounded corners shows the smallest amount of deformation, when the amount of deformation of a secondary battery case 110 without elements 115 and 430 for compensating for and preventing volumetric expansion is 100%. Specifically, a secondary battery case with approximately square elements 115 and 430 having a groove or protrusion extending along both diagonal directions with a predetermined width, as shown in FIG. 3A produces the best results.

As such, even when the internal pressure rises in the secondary battery 100 having a secondary battery case 110 provided with elements 115 and 430 for compensating for and preventing volumetric expansion, the elements 115 and 430 for compensating for and preventing volumetric expansion formed on a lateral surface of the lithium secondary battery case 110 in a recessed or protruding shape prevents the secondary battery case 110 form deforming.

As mentioned above, the present invention provides a secondary battery having at least one element to compensate for and prevent volumetric expansion during charging/discharging of the battery, in order to prevent the electrode assembly from deforming due to rising internal pressure and to compensate for and prevent the expansion of the secondary battery case.

Although exemplary embodiments of the present invention have been described for illustrative purposes, those skilled in the art will appreciate that various modifications, additions and substitutions are possible, without departing from the scope and spirit of the present invention as recited in the accompanying claims.

What is claimed is:

1. A secondary battery, comprising:
an electrode assembly having a positive electrode plate and a negative electrode plate, and further including a separator interposed between the positive and negative electrode plates;
a case having a space for containing the electrode assembly and having a plurality of sides including a first side, the first side having at least one element to compensate for and prevent volumetric expansion of the case arranged at a center portion of the first side and a peripheral portion of the first side surrounding said at least one element, the at least one element being a protruding ridge that protrudes further towards an exterior of the case than the peripheral portion of the first side; and
a cap assembly attached to the case for sealing the case, the cap assembly including a terminal portion electrically connected to the electrode assembly;
wherein a thickness t1 of the first side of the case at a location that corresponds to said at least one element is identical to a thickness t2 of the first side of the case at a location that corresponds to the peripheral portion surrounding said at least one element; and
wherein said at least one element is arranged only at the central portion of the first side of the case, the at least one element including a first protruding portion and second protruding portions extending from each opposing end of the first protruding portion and forming oblique angles with a longitudinal direction of the first protruding portion.

2. The secondary battery as claimed in claim 1, wherein the case has a box shape with an open top, a bottom portion, and the plurality of sides include four lateral sides including two long-sided portions and two short-sided portions, and wherein said at least one element to compensate for and to prevent volumetric expansion is arranged on at least one of the two long-sided portions of the four lateral sides of the case.

3. The secondary battery as claimed in claim 1, wherein a height the protruding ridge of said at least one element to compensate for and to prevent volumetric expansion projects perpendicularly from an external side of the first side and corresponds to 5% to 15% of a distance between the first side on which said at least one element to compensate for and to prevent volumetric expansion is arranged and an opposing one of the sides opposite the first side.

4. The secondary battery as claimed in claim 2, wherein said at least one element to compensate for and to prevent volumetric expansion comprises two elements, and the two elements are arranged on two facing lateral sides of the four lateral sides of the case.

5. The secondary battery as claimed in claim 4, wherein said at least one element to compensate for and to prevent volumetric expansion comprises two elements, and the two elements are arranged on the two long-sided portions of the four lateral sides of the case.

6. The secondary battery as claimed in claim 2, wherein a length of said at least one element to compensate for and to prevent volumetric expansion that extends in a height direction of the case corresponds to 30% to 40% of a height of said at least one of the two long-sided portions of the four lateral sides of the case on which said at least one element to compensate for and to prevent volumetric expansion is arranged.

7. The secondary battery as claimed in claim 2, wherein a width of said at least one element to compensate for and to prevent volumetric expansion that extends in a width direction of the case corresponds to 30% to 40% of a width of said at least one of the two long-sided portions of the four lateral sides of the case on which said at least one element to compensate for and to prevent volumetric expansion is arranged.

8. The secondary battery as claimed in claim 2, wherein a surface area of said at least one element to compensate for and to prevent volumetric expansion corresponds to 9% to 16% of a surface area of said at least one of the two long-sided portions of the four lateral sides of the case on which said at least one element to compensate for and to prevent volumetric expansion is arranged.

9. A secondary battery, comprising:
an electrode assembly having a positive electrode plate and a negative electrode plate, and further including a separator interposed between the positive and negative electrode plates; and
a box shaped case having an open top and having an enclosure including four lateral sides defining a space for containing the electrode assembly and a bottom portion for sealing a lower space of the enclosure, the box shaped case being attached to a top to a cap assembly, the case having at least one element to compensate for and prevent volumetric expansion of the case that includes a first protruding portion and a second protruding portion, the first protruding portion being at least one square element arranged at a center portion of at least one of the four lateral sides of the box shaped case to compensate for and to prevent volumetric expansion, the at least one of the four lateral sides further including a peripheral portion surrounding said at least one square element;
wherein the cap assembly is attached to the box shaped case to seal it;
wherein the cap assembly includes a terminal portion electrically connected to the electrode assembly;
wherein a thickness t1 of the at least one of the four lateral sides of the case at a location that corresponds to said at least one square element is identical to a thickness t2 of the peripheral portion of the at least one of the four lateral sides of the case at a location external to said at least one square element; and
wherein said at least one square element is only arranged at the central portion of the at least one of the four lateral sides of the box shaped case,
wherein the at least one square element protrudes further towards an exterior of the case than the peripheral portion of the at least one of the four lateral sides of the case, wherein the second protruding portion extending from corners of the at least one square element and along diagonal directions thereof.

10. The secondary battery as claimed in claim 9, wherein said at least one square element to compensate for and to prevent volumetric expansion comprises two elements, and the two elements are arranged on two opposing and facing long-sided portions of the four lateral sides of the enclosure.

11. A secondary battery, comprising:
an electrode assembly having a positive electrode plate and a negative electrode plate, and further including a separator interposed between the positive and negative electrode plates; and
a box shaped case having an open top and having an enclosure comprising four lateral sides and defining a space to contain the electrode assembly and a bottom portion to seal a lower space of the enclosure, the box shaped case being attached at a top to a cap assembly, the case having at least one element to compensate for and prevent volumetric expansion of the case that includes first and second protruding portions arranged at a center portion of one of the four lateral sides of the box shaped case, the one of the four lateral sides further including a peripheral portion surrounding the first and second protruding portions, wherein the first protruding portion to compensate for and to prevent volumetric expansion has a square shape and the second protruding portion to compensate for and to prevent volumetric expansion extends along diagonal directions of the one of the four lateral sides of the case to compensate for and to prevent volumetric expansion;
wherein the cap assembly is attached to the case to seal the electrode assembly within the enclosure of the case;
wherein the cap assembly includes a terminal portion electrically connected to the electrode assembly;
wherein a thickness t1 of the one of the four lateral sides of the case at a location that corresponds to the first protruding portion and a thickness t3 of the one of the four lateral sides of the case at a location that corresponds to the second protruding portion are identical to a thickness t2 of the one of the four lateral sides of the case at a location that corresponds to the peripheral portion surrounding the first and second protruding portions; and
wherein the first and second protruding portions are arranged only at the central portion of the one of the four lateral sides of the box shaped case,
wherein each of the first and second protruding portions protrude towards an exterior of the case.

12. A secondary battery, comprising:
an electrode assembly having a positive electrode plate and a negative electrode plate, and further including a separator interposed between the positive and negative electrode plates; and
a case having an enclosure including four lateral sides in a shape of a box having an open top and a bottom to seal a lower space of the enclosure, the case being attached at a top thereof to a cap assembly, the case having at least one element to compensate for and prevent volumetric expansion of the case arranged at a center portion of one of the four lateral sides of the case, the one of the four lateral sides further including a peripheral portion surrounding said at least one element, said at least one element to compensate for and to prevent volumetric expansion including first and second elements arranged on the one of the four lateral sides of the case while being spaced-apart from each other;
wherein the cap assembly is attached to the case to seal the electrode assembly within the enclosure of the case;
wherein the cap assembly includes a terminal portion electrically connected to the electrode assembly;
wherein a thickness t1 of the one of the four lateral sides of the case at a location that corresponds to said at least one element being identical to a thickness t2 of the one of the four lateral sides of the case at a location that corresponds to the peripheral portion surrounding said at least one element; and
wherein the at least one element is arranged only at the central portion of the one of the four lateral sides of the case,
wherein each of the first and second elements include first and second protruding portions that are protruding ridges, second protruding portion extending in a direction that forms an oblique angle with an extending direction of the first protruding portion along the one of the four lateral sides for each of the first and second elements.

13. The secondary battery as claimed in claim 12, wherein the first protruding portions of the first and second elements are parallel to each other.

14. The secondary battery as claimed in claim 13, wherein the second protruding portions of the first and second elements extend from each opposing end of a corresponding first protruding portion.

15. The secondary battery as claimed in claim 1, wherein the positive electrode plate comprises a positive electrode active material arranged on at least one surface of a positive electrode collector, and the negative electrode plate comprises a negative electrode active material arranged on at least one surface of a negative electrode collector.

16. The secondary battery as claimed in claim 9, wherein the positive electrode plate comprises a positive electrode active material arranged on at least one surface of a positive electrode collector, and the negative electrode plate comprises a negative electrode active material arranged on at least one surface of a negative electrode collector.

17. The secondary battery as claimed in claim 11, wherein the positive electrode plate comprises a positive electrode active material arranged on at least one surface of a positive electrode collector, and the negative electrode plate comprises a negative electrode active material arranged on at least one surface of a negative electrode collector.

18. The secondary battery as claimed in claim 12, wherein the positive electrode plate comprises a positive electrode active material arranged on at least one surface of a positive electrode collector, and the negative electrode plate comprises a negative electrode active material arranged on at least one surface of a negative electrode collector.

* * * * *